United States Patent
Lee et al.

(10) Patent No.: US 10,850,652 B2
(45) Date of Patent: Dec. 1, 2020

(54) AIR CONDITIONING DEVICE FOR VEHICLE SEAT

(71) Applicant: Hanon Systems, Daejeon (KR)

(72) Inventors: Dong Kyu Lee, Daejeon (KR); Sung Je Lee, Daejeon (KR); Dong Hoon Oh, Daejeon (KR); Sang Gu Woo, Daejeon (KR); Jong Bo Won, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/094,267

(22) PCT Filed: Jan. 23, 2018

(86) PCT No.: PCT/KR2018/000979
§ 371 (c)(1),
(2) Date: Oct. 17, 2018

(87) PCT Pub. No.: WO2018/155823
PCT Pub. Date: Aug. 30, 2018

(65) Prior Publication Data
US 2019/0366890 A1    Dec. 5, 2019

(30) Foreign Application Priority Data
Feb. 22, 2017  (KR) .................. 10-2017-0023279

(51) Int. Cl.
*B60N 2/56*   (2006.01)
*B60H 1/00*   (2006.01)
*B60H 1/02*   (2006.01)

(52) U.S. Cl.
CPC ......... *B60N 2/5628* (2013.01); *B60N 2/5657* (2013.01); *B60H 1/00285* (2013.01); *B60H 1/02* (2013.01)

(58) Field of Classification Search
CPC .. B60H 1/00285; B60H 1/246; B60N 2/5657; B60N 2/56; B60N 2/5628
(Continued)

(56) References Cited

U.S. PATENT DOCUMENTS 3,097,505 A * 7/1963 Smith ...................... F24F 1/02
                                                      62/261
5,450,894 A * 9/1995 Inoue .................. B60H 1/00664
                                                      165/43

(Continued)

FOREIGN PATENT DOCUMENTS

JP    5-286346 A    11/1993
JP    6-156058 A    6/1994
(Continued)

*Primary Examiner* — Vivek K Shirsat
(74) *Attorney, Agent, or Firm* — Norton Rose Fulbright US LLP; James R. Crawford

(57) ABSTRACT

The present disclosure relates to an air conditioning device for a vehicle seat; can include a seat duct formed on a seat of a vehicle, a seat air conditioning unit formed on a lower frame on which the seat is mounted, and a separation space interposed between the seat and the lower frame; and can be formed so that the air is discharged from the air conditioning unit into the separation space, and the air of the separation space is supplied to the seat duct. As a result, it is possible to enhance the mobility of the seat, and to prevent noise and vibration due to driving parts from being delivered to a passenger.

8 Claims, 5 Drawing Sheets

(58) Field of Classification Search
USPC .............................. 454/120, 907; 297/180.14
See application file for complete search history.

(56) References Cited

U.S. PATENT DOCUMENTS

| | | | |
|---|---|---|---|
| 6,478,369 B1 | 11/2002 | Aoki et al. | |
| 2017/0015226 A1* | 1/2017 | Wolas | B60N 2/5628 |
| 2019/0047449 A1* | 2/2019 | Fujii | B60N 2/565 |

FOREIGN PATENT DOCUMENTS

| | | | |
|---|---|---|---|
| JP | H06156058 A | 6/1994 | |
| JP | 2011254882 A | 12/2011 | |
| JP | 2016145015 A | 8/2016 | |
| KR | 20080037901 A | 5/2008 | |

* cited by examiner

AIR CONDITIONING DEVICE FOR VEHICLE SEAT

This application is a national phase under 35 U.S.C. § 371 of International Application No. PCT/KR2018/000979, filed Jan. 23, 2018, which claims the benefit of priority to Korean Application No. 10-2017-0023279, filed Feb. 22, 2017. The entire contents of these applications are incorporated herein by reference in their entirety.

TECHNICAL FIELD

The present disclosure relates to an air conditioning device for a vehicle seat, and more particularly, to an air conditioning device for a vehicle seat, which can supply the air of the air conditioning to a passenger seated on a seat through the seat of a vehicle.

BACKGROUND ART

Generally, an air conditioner (hereinafter, referred to as an air conditioning device), as a device for keeping the condition such as temperature, humidity, etc. of the air in the state suitable for the purpose of use, is used in various fields such as a vehicle and a building, and particularly, in an air conditioning device for a vehicle, it is used to cool or heat the passenger compartment of the vehicle or to remove frost, etc. covered on a windshield.

Meanwhile, the air conditioning device for the vehicle is generally configured to provide a cooling/heating unit and an air blowing unit using the heat of an engine at the front side of the passenger compartment, such that it is formed to selectively introduce internal air or external air and then to heat or cool the air, thus blowing it to the passenger compartment.

However, recently, as a vehicle that does not use the heat of the engine such as an electric vehicle emerges, the need for the air conditioning device for the vehicle having various structures and installation locations, etc. has been highlighted, and as disclosed in Japanese Patent Application Publication No. 2016-145015, the air conditioning device for the vehicle seat that can supply the air of the air conditioning to the passenger compartment seated on the seat through the seat of the vehicle has been disclosed.

Referring to Japanese Patent Application Publication No. 2016-145015, the conventional air conditioning device for the vehicle seat includes a vapor compression refrigeration cycle mechanism, and is formed to mount the evaporator and the condenser of the vapor compression refrigeration cycle mechanism on the lower portion of the seat, and to blow cooling air flowing through the evaporator into the seat to supply the cooling air to the passenger seated on the seat. In this time, it is formed to discharge the warm air flowing through the condenser that is waste heat into the rear side of the seat.

However, there is a problem in that the conventional air conditioning device for the vehicle seat has hindered the mobility of the seat.

In addition, there is a problem in that the driving parts of the air conditioning device for the vehicle seat has been mounted on the seat, such that noise and vibration due to the driving parts has been delivered to the passenger.

DISCLOSURE

Technical Problem

Accordingly, an object of the present disclosure is to provide an air conditioning device for a vehicle seat, which can enhance the mobility of a seat.

In addition, another object of the present disclosure is to provide an air conditioning device for a vehicle seat, which can prevent noise and vibration due to diving parts from being delivered to a passenger.

Technical Solution

For achieving the objects, the present disclosure provides an air conditioning device for a vehicle seat that includes a seat duct formed on a seat of a vehicle, an seat air conditioning unit formed on a lower frame on which the seat is mounted, and a separation space interposed between the seat and the lower frame; and is formed so that the air is discharged from the air conditioning unit into the separation space, and the air of the separation space is supplied to the seat duct.

The seat air conditioning unit can include a first heat exchanger operated as any one of an evaporator and a condenser, a second heat exchanger operated as the other one of the evaporator and the condenser, a compressor, an expansion means, and a vapor compression refrigeration cycle mechanism having a refrigerant flow path passing through the first heat exchanger, the second heat exchanger, the compressor, and the expansion means; a first air blower for flowing the air through the first heat exchanger; and a second air blower for flowing the air through the second heat exchanger.

The first heat exchanger and the first air blower can be formed to suction air from a passenger compartment of a vehicle to flow through the first heat exchanger, and then to supply it to the separation space, and the second heat exchanger and the second air blower can be formed to suction air from an outside of the vehicle to flow through the second heat exchanger, and then to discharge it into the outside of the vehicle. By adjusting the refrigerant flow path, the vapor compression refrigerant cycle mechanism is formed so that the second heat exchanger is operated as a condenser when the first heat exchanger is operated as an evaporator, and the second heat exchanger is operated as an evaporator when the first heat exchanger is operated as a condenser.

The first heat exchanger, the first air blower, and an inlet of the seat duct can be formed in the separation space between the seat and the lower frame.

The seat can be movably formed, the first heat exchanger can be formed within a movement range of the seat, and the first air blower can be formed at the inlet side of the seat duct.

The seat can be formed with a partition member enclosing the separation space and having an inlet for guiding the air of a passenger compartment to the separation space.

The partition member can have one end portion fixed to the seat, and have the other end portion formed with a curtain that is slidable with respect to the lower frame.

The partition member can have one end portion fixed to the seat, have the other end portion fixed to the lower frame, and can be formed of a flexible material that at least part thereof can be deformed.

A console provided on the side portion of the seat can be formed with a heat exchange space in which the first heat exchanger is installed, an inlet for guiding the air of a passenger compartment to the heat exchange space, and a discharge flow path for guiding the air of a heat exchange space to the separation space; and the first air blower can be formed on any one of the heat exchange space, the inlet, and the discharge flow path.

The first heat exchanger and the first air blower can be formed on an outside of the vehicle, and the lower frame can be formed with a flow path extended from a passenger compartment of the vehicle to the first heat exchanger and the first air blower sides and a flow path extended from the first heat exchanger and the first air blower side to the separation space.

The second heat exchanger, the second air blower, and the compressor can be installed on an outside of the vehicle.

The lower frame can include a recess part that is recessed from the outside of the vehicle toward a passenger compartment side of the vehicle, and the second heat exchanger, the second air blower, and the compressor can be received in the recess part.

The lower frame can be formed with a cover for covering the recess part, and the cover can be formed to prevent the second heat exchanger, the second air blower, and the compressor from being collided with a road surface.

Advantageous Effects

The air conditioning device for the vehicle seat in accordance with the present disclosure can include the seat duct formed on the seat of the vehicle, the seat air conditioning unit formed on the lower frame on which the seat is mounted, and the separation space interposed between the seat and the lower frame; and can be formed so that the air is discharged from the air conditioning unit into the separation space, and the air of the separation space is supplied to the seat duct. As a result, it is possible to enhance the mobility of the seat.

In addition, it is possible to prevent the noise and vibration due to the driving part from being delivered to the passenger.

BEST MODE

Hereinafter, an air conditioning device for a vehicle seat in accordance with the present disclosure will be described in detail with reference to the accompanying drawings.

Figure 1:
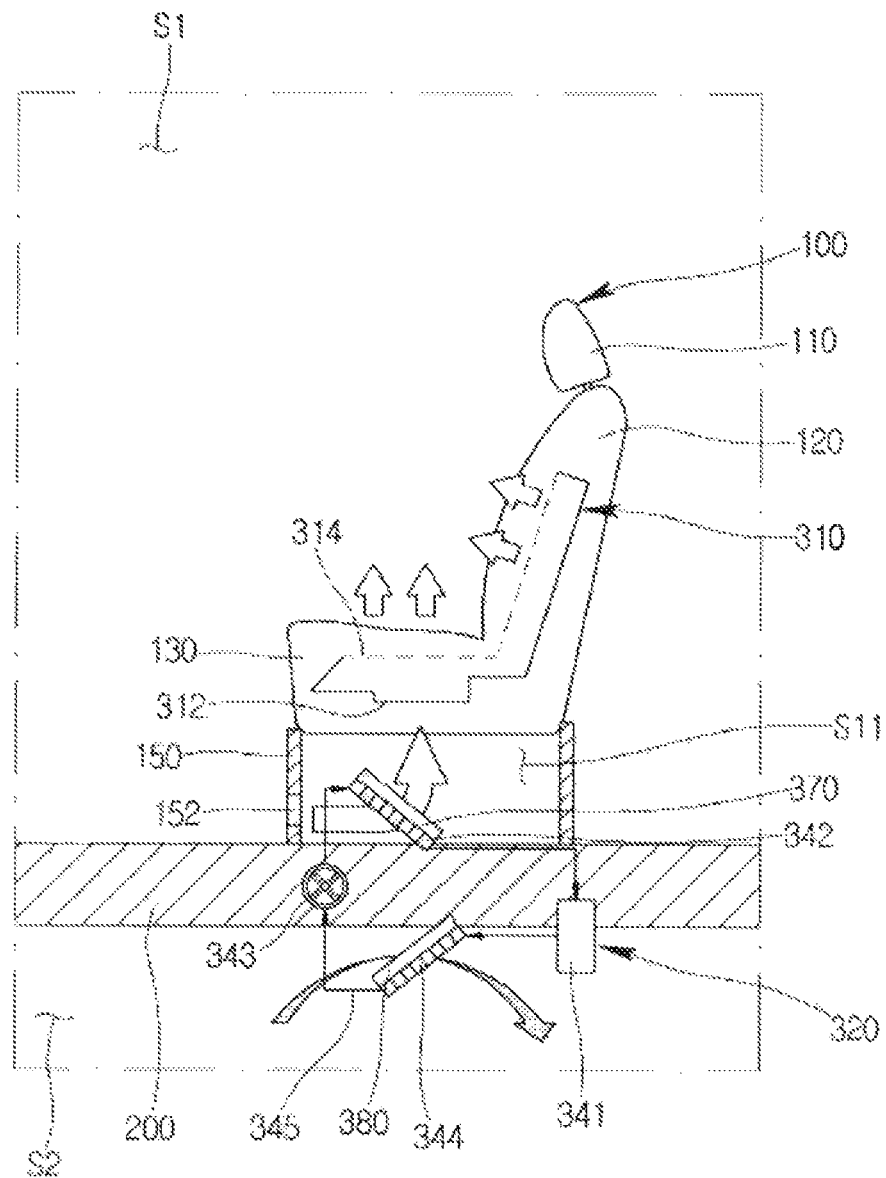
FIG. 1 is a systematic diagram illustrating a cooling mode in an air conditioning device for a vehicle seat in accordance with an embodiment of the present disclosure.
Figure 2:
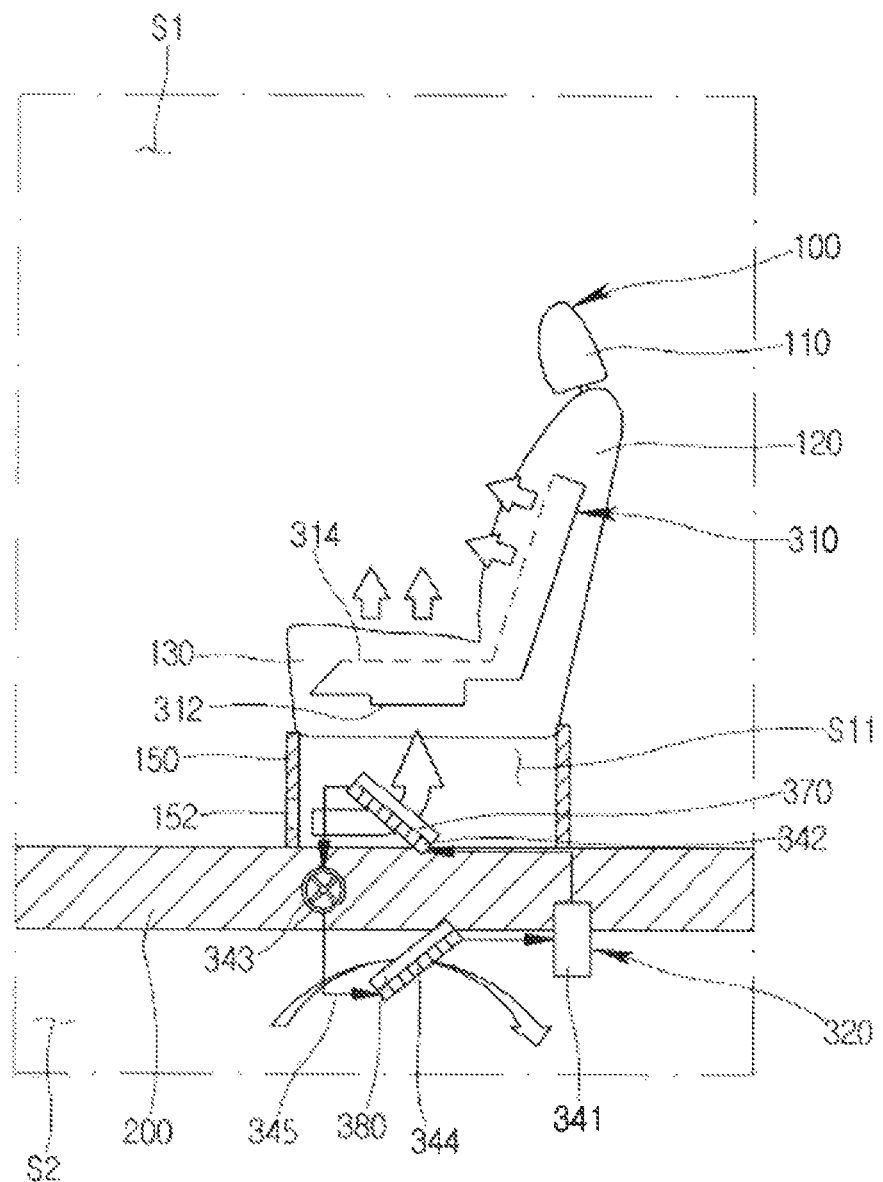
FIG. 2 is a systematic diagram illustrating a heating mode in the air conditioning device for the vehicle seat in FIG. 1.

FIG. 1 is a systematic diagram illustrating a cooling mode in an air conditioning device for a vehicle seat in accordance with an embodiment of the present disclosure, and FIG. 2 is a systematic diagram illustrating a heating mode in the air conditioning device for the vehicle seat in FIG. 1.

Referring to FIGS. 1 and 2, an air conditioning device for a vehicle seat in accordance with an embodiment of the present disclosure can include a seat duct 310 formed on a seat 100 of a vehicle and a seat air conditioning unit 320 for supplying air to the seat duct 310. Herein, the seat 100 can be provided in plural in the vehicle, and the seat duct 310 and the seat air conditioning unit 320 can be formed to be provided for each of a plurality of seats 100, thus independently performing air conditioning.

The seat duct 310, as an air flow path provided inside the seat 100 for supplying the air of the air conditioning to the passenger seated on the seat 100, can include a seat duct inlet 312 into which the air supplied by the seat air conditioning unit 320 is flowed, and a seat duct outlet 314 that discharges the air inside the seat duct 310 to the passenger side.

Herein, the seat 100 can include a headrest 110 for supporting the passenger's head, a seat back 120 for supporting the passenger's back, a seat cushion 130 for supporting the passenger's buttocks and a legrest (not illustrated) for supporting the passenger's leg; the seat duct inlet 312 can be formed on any one of the headrest 110, the seat back 120, the seat cushion 130, and the legrest (not illustrated); and the seat duct outlet 314 can be formed on at least one of the headrest 110, the seat back 120, the seat cushion 130, and the legrest (not illustrated). In the present embodiment, the seat duct inlet 312 can be formed on the seat cushion 130, and the seat duct outlet 314 can be formed on the seat cushion 130 and the seat back 120.

The seat air conditioning unit 320 can include a first heat exchanger 342 operated as any one of an evaporator and a condenser; a second heat exchanger 344 operated as the other one of the evaporator and the condenser; a compressor 341; an expansion means 343; a vapor compression refrigeration cycle mechanism 340 having a refrigerant flow path 345 passing through the first heat exchanger 342, the second heat exchanger 344, the compressor 341, and the expansion means 343; a first air blower 370 for flowing air through the first heat exchanger 342; and a second air blower 380 for flowing air through the second heat exchanger 344.

Herein, the seat air conditioning unit 320 can be formed to supply cooling air and heating air to the seat duct 310 and discharges waste heat to an outside S2 of the vehicle, and to prevent the noise and the vibration due to driving parts of the seat air conditioning unit 320 from being delivered to a passenger.

Specifically, in order to provide both cooling and heating, the vapor compression refrigeration cycle mechanism 340 can be formed so that depending upon the adjustment of the refrigerant flow path 345, the second heat exchanger 344 is operated as a condenser when the first heat exchanger 342 is operated as an evaporator in a cooling mode, and the second heat exchanger 344 is operated as an evaporator when the first heat exchanger 342 is operated as a condenser in a heating mode.

Then, the vapor compression refrigeration cycle mechanism 340, the first air blower 370, and the second air blower 380 can be formed so that they are installed on a lower frame 200 on which the seat 100 is mounted in order to prevent the noise and vibration from being delivered to the passenger through the seat 100; the air of a passenger compartment S1 is flowed through the first heat exchanger 342 by the first air blower 370 and then supplied to the seat duct 310 in order to provide cooling or heating and prevent waste heat from being discharged to the passenger compartment S1 of the vehicle; and the air of the outside S2 of the vehicle is flowed through the second heat exchanger 344 by the second air blower 380 and then discharged into the outside S2 of the vehicle again.

Herein, the first heat exchanger 342 and the first air blower 370 can be installed on the lower frame 200 at the passenger compartment S1 side in order to easily suction the air of the passenger compartment S1, guide it to the seat duct 310, and prevent the noise and vibration by the first heat exchanger 342 and the first air blower 370 from being delivered to the passenger.

Then, the second heat exchanger 344 and the second air blower 380 can be installed on the lower frame 200 at the outside S2 of the vehicle in order to easily suction and discharge the air of the outside S2 of the vehicle and more effectively prevent the noise and vibration by the second heat exchanger 344 and the second air blower 380 from being delivered to the passenger.

Then, the compressor 341 and the expansion means 343 can be also installed on the lower frame 200 at the outside S2 of the vehicle in order to more effectively prevent the noise and vibration by the compressor 341 and the expansion means 343 from being delivered to the passenger.

Meanwhile, the seat air conditioning unit 320 can be formed in order not to hinder the mobility of the seat 100.

Specifically, the seat 100 can be rotatably formed so that it can have a round trip in the front and rear directions of the vehicle or the left and right directions thereof, or the front of the seat faces the front and rear of the vehicle.

Accordingly, the seat air conditioning unit 320 fixed to the lower frame 200 is required to be formed in order not to hinder the mobility of the seat 100.

Considering the above, in the present embodiment, the first heat exchanger 342, the first air blower 370, and the seat duct inlet 312 can be formed in a separation space S11 between the seat 100 and the lower frame 200. That is, without a separate pipe, it can be formed so that the first air blower 370 suctions the air of the passenger compartment S1 into the separation space S11, the first heat exchanger 342 cools or heats the air of the separation space S11, and the first air blower 370 supplies the cooled or heated air of the separation space S11 to the seat duct inlet 312. Accordingly, it is possible to prevent the pipe in which the first heat exchanger 342 and the first air blower 370 are received from hindering the movement of the seat 100 in advance.

Herein, the first heat exchanger 342 can be formed in the movement range region of the seat 100, and the first air blower 370 can be fixed to the first heat exchanger 342 and fixed to the first heat exchanger 342 at the seat duct inlet 312 side so that the direction of the air discharged from the first air blower 370 faces the seat duct inlet 312 side.

Then, the seat can be formed with a partition member 150 enclosing the separation space S11 so that the air cooled or heated by the first heat exchanger 342 is not guided to the seat duct 310 and is prevented from being leaked to the passenger compartment S1.

The partition member 150 can have one end portion fixed to the seat 100 and have the other end portion formed with a curtain that is slidable with respect to the lower frame 200 in order to be movable with the seat 100.

Then, one side of the partition member 150 can be formed with an inlet 152 for guiding the air of the passenger compartment S1 to the separation space S11.

Hereinafter, the operation effects of the air conditioning device for the vehicle seat in accordance with the present embodiment will be described.

First, referring to FIG. 1, a cooling mode will be described.

In a cooling mode, the vapor compression refrigeration cycle mechanism 340 can be operated so that the first heat exchanger 342 is operated as an evaporator and the second heat exchanger 344 is operated as a condenser. That is, the vapor compression refrigeration cycle mechanism 340 can repeat a series of procedure absorbing the external heat while the compressor 341 applies work to the refrigerant of the gas state of low temperature and low pressure to change it into the refrigerant of the gas state of high temperature and high pressure, the second heat exchanger 344 delivers the heat from the refrigerant of the gas state of high temperature and high pressure changed in the compressor 341 to the outside to change it into the refrigerant of the liquid state of medium temperature and high pressure, the expansion means 343 changes the liquid refrigerant of medium temperature and high pressure changed in the second heat exchanger 344 into the liquid refrigerant of low temperature and low pressure, and the first heat exchanger 342 changes the refrigerant of the liquid state of low temperature and low pressure changed in the expansion means 343 into the gas state.

Then, the first air blower 370 can flow the air of the passenger compartment S1 through the first heat exchanger 342 that is operating as an evaporator and then supply it to the seat duct 310, thus providing cooling to the passenger seated on the seat 100.

Then, the second air blower 380 can flow the air of the outside S2 of the vehicle through the second heat exchanger 344 that is operating as a condenser and then discharge it to the outside S2 of the vehicle, thus discharging waste heat (warm air) into the outside S2 of the vehicle. That is, it is possible to prevent the waste heat (warm air) from being discharged to the passenger compartment S1. Accordingly, it is possible to prevent the overall temperature of the passenger compartment S1 from being increased and to prevent the unintended heating from being provided to the passenger seated on the rear seat 100.

Next, referring to FIG. 2, a heating mode will be described,

In a heating mode, the vapor compression refrigeration cycle mechanism 340 can be operated so that the first heat exchanger 342 is operated as a condenser, and the second heat exchanger 344 is operated as an evaporator. That is, the vapor compression refrigerant cycle mechanism 340 can repeat a series of procedures absorbing the external heat while the compressor 341 applies work to the refrigerant of the gas state of low temperature and low pressure to change it into the refrigerant of the gas state of high temperature and high pressure; the first heat exchanger 342 delivers heat from the refrigerant of the gas state of high temperature and high pressure changed in the compressor 341 to the outside to change it into the refrigerant of the liquid state of medium temperature and high pressure; the expansion means 343 changes the liquid refrigerant of medium temperature and high pressure changed in the first heat exchanger 342 into the liquid refrigerant of low temperature and low pressure; and the second heat exchanger 344 changes the refrigerant of the liquid state of low temperature and low pressure changed in the expansion means 343 into the gas state.

Then, the first air blower 370 can flow the air of the passenger compartment S1 through the first heat exchanger 342 that is operating as a condenser and then supply it to the seat duct 310, thus providing heating to the passenger seated on the seat 100.

Then, the second air blower 380 can flow the air of the outside S2 of the vehicle through the second heat exchanger 344 that is operating as an evaporator and then discharge it into the outside S2 of the vehicle, thus discharging the waste heat (cooling air) into the outside S2 of the vehicle. That is, it is possible to prevent the waste heat (cooling air) from being discharged into the passenger compartment S1. Accordingly, it is possible to prevent the overall temperature of the passenger compartment S1 from being reduced, and to prevent the unintended cooling from being provided to the passenger seated on the rear seat 100.

Herein, as the seat air conditioning unit 320 is not installed on the seat 100 and is installed on the lower frame 200, it is possible to prevent the noise and vibration by the seat air conditioning unit 320 from being delivered to the passenger through the seat 100.

Then, as the second heat exchanger 344, the second air blower 380, the compressor 341, and the expansion means 343 are installed on the outside S2 of the vehicle, it is possible to more effectively prevent the noise and vibration by the second heat exchanger 344, the second air blower 380, the compressor 341, and the expansion means 343 from being delivered to the passenger.

Then, as the first heat exchanger 342 and the first air blower 370 are formed to suction the air of the passenger compartment S1 into the separation space S11 without a separate pipe and to cool and heat the air of the separation space S11 and then to supply it to the seat duct 310, it is possible to provide cooling and heating while not hindering the movement of the seat 100.

Then, the partition member 150 does not hinder the movement of the seat 100 and can prevent the air of the separation space S11 from being leaked to the passenger compartment S1, thus enhancing the cooling and heating performance.

Meanwhile, in the present embodiment, the partition member 150 is formed of a curtain type, but the partition member 150 can have one end portion fixed to the seat 100, and have the other end portion fixed to the lower frame 200, and can be formed of a flexible material that at least part thereof can be deformed. In this case, it is possible to more effectively prevent the air of the separation space S11 from being leaked between the other end portion of the partition member 150 and the lower frame 200.

Figure 3:
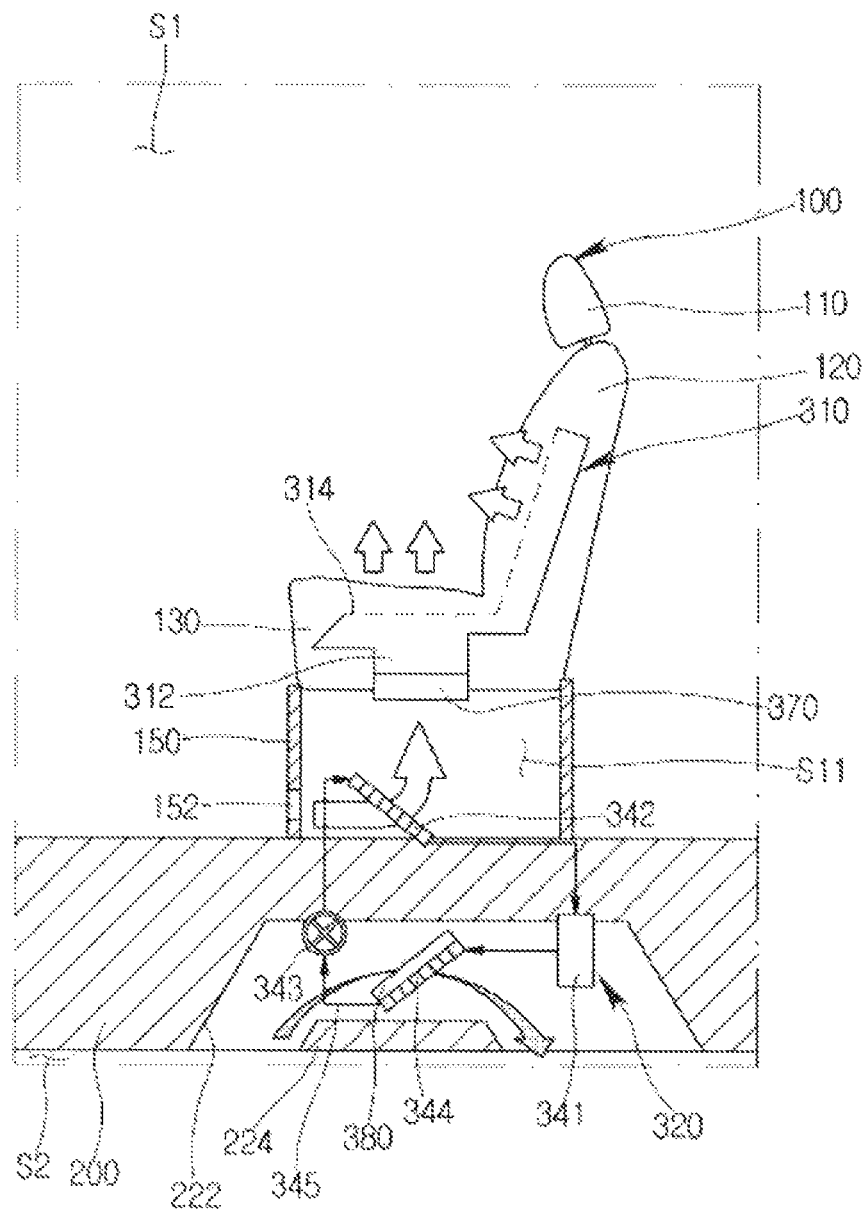
FIG. 3 is a systematic diagram illustrating a cooling mode in an air conditioning device for a vehicle seat in accordance with another embodiment of the present disclosure.
Figure 4:
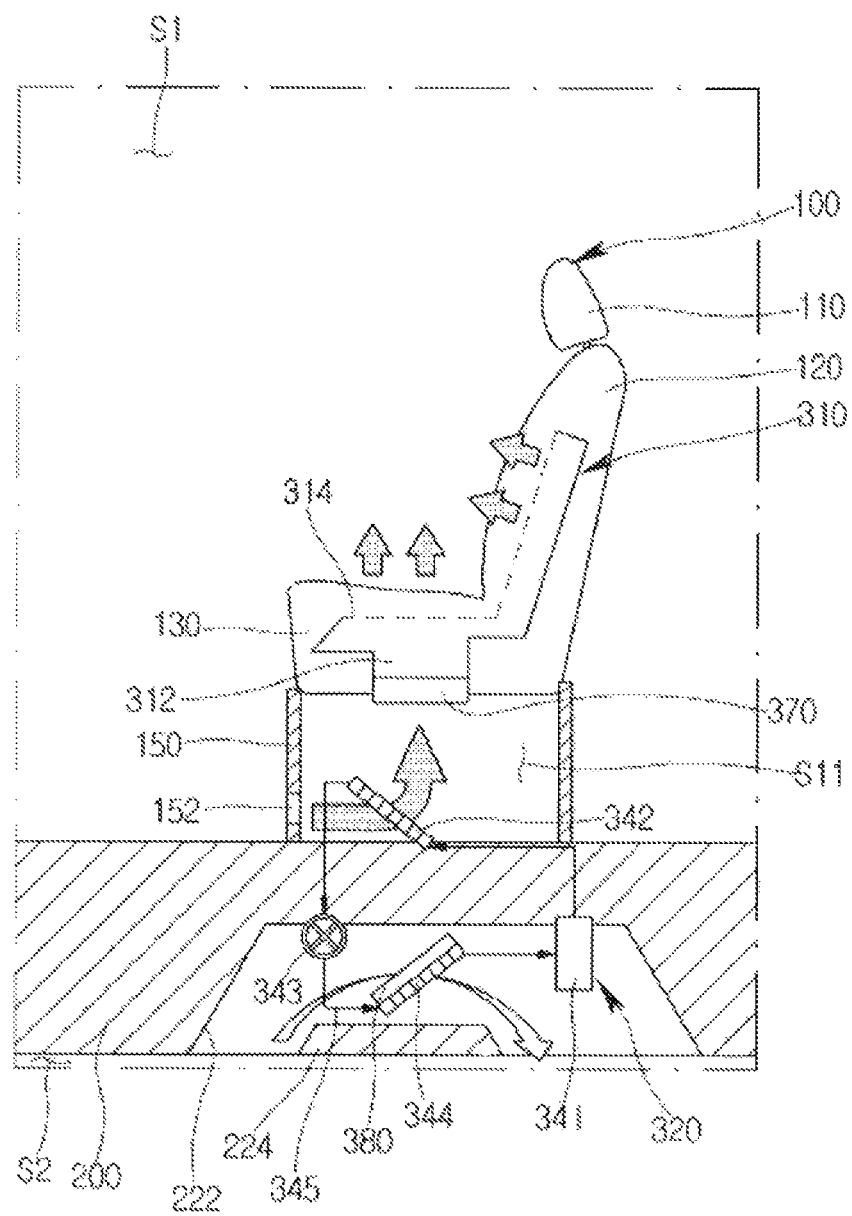
FIG. 4 is a systematic diagram illustrating a heating mode in the air conditioning device for the vehicle seat in FIG. 3.

Meanwhile, when exposed to the outside S2 of the vehicle, the second heat exchanger 344, the second air blower 380, the compressor 341, and the expansion means 343 can be also collided with a road surface. Considering the above, as illustrated in FIGS. 3 and 4, the lower frame 200 can include a recess part 222 that is recessed from the outside S2 of the vehicle to the passenger compartment S1 side, and the second heat exchanger 344, the second air blower 380, the compressor 341, and the expansion means 343 can be formed to be received in the recess part 222. In this case, it is possible to prevent the second heat exchanger 344, the second air blower 380, the compressor 341, and the expansion means 343 from being collided with the road surface.

In addition, as illustrated in FIGS. 3 and 4, when a cover 224 for covering the recess part 222 is formed on the lower frame 200, it is possible to more effectively prevent the second heat exchanger 344, the second air blower 380, the compressor 341, and the expansion means 343 from being collided with the road surface.

Meanwhile, in the present embodiment, the first air blower 370 is fixed to the first heat exchanger 342 and the second air blower 380 is fixed to the second heat exchanger 344, but as illustrated in FIGS. 3 and 4, the first air blower 370 can be also fixed to the seat 100 at the seat duct inlet 312 side. In this case, the noise and vibration of the first air blower 370 is delivered to the passenger through the seat 100, but the air flowing through the first heat exchanger 342 can be more effectively guided to the seat duct inlet 312. That is, when the seat 100 is moved, it is possible to prevent the problem in advance in that the air flowing through the first heat exchanger 342 is not guided to the seat duct inlet 312.

Meanwhile, in the present embodiment, a part of the seat air conditioning unit 320 is formed in the separation space 311, and a part of the seat air conditioning unit 320 is formed in a space (e.g., the outside of the vehicle) different from the separation space S11. However, it is not limited thereto, and the overall seat air conditioning unit 320 can be also formed on a space (e.g., the outside of the vehicle) different from the separation space S11. In this case, the lower frame 200 can be formed with a flow path in which the air flowing through the first heat exchanger 342 is flowed in from the passenger compartment S1 and a flow path in which the air flowing through the first heat exchanger 342 is discharged into the separation space S11.

Figure 5:
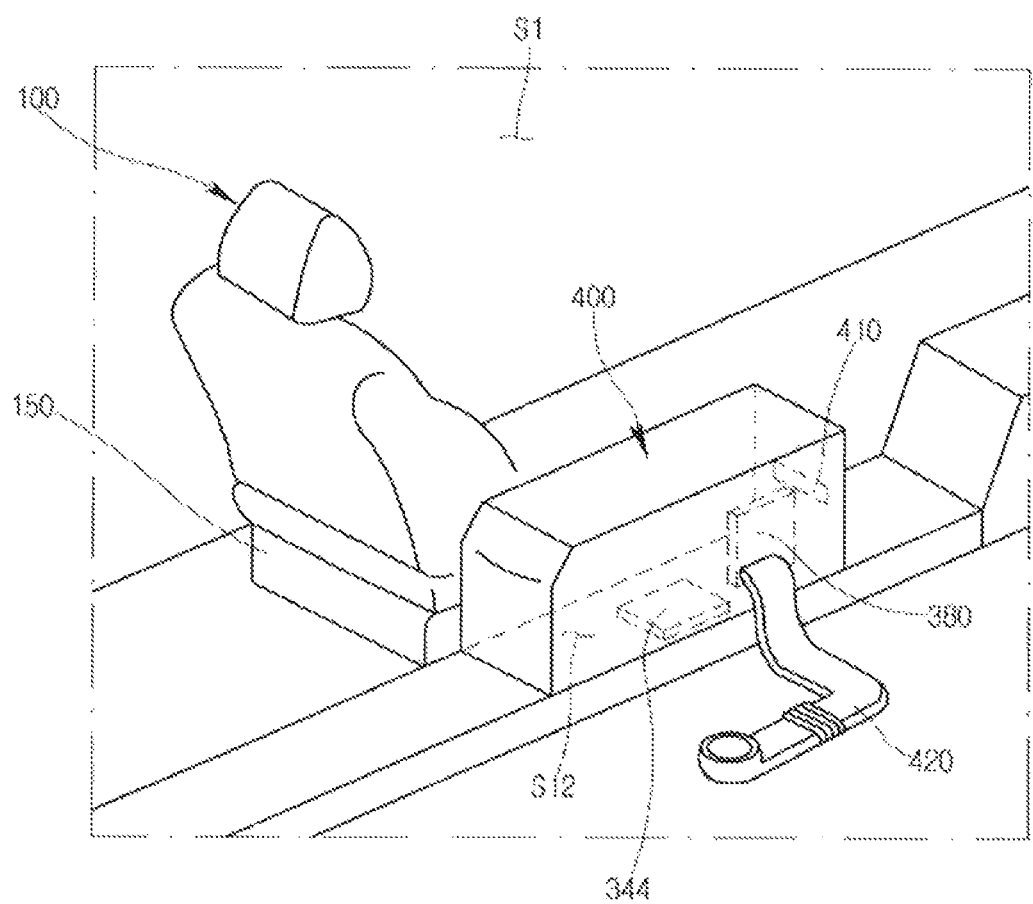
FIG. 5 is a systematic diagram illustrating an air conditioning device for a vehicle seat in accordance with still another embodiment of the present disclosure.

Meanwhile, in the present embodiment, the seat air conditioning unit 320 is formed below the seat 100, but as illustrated in FIG. 5, can be formed below a console 400 provided on the side portion of the seat 100. In this time, the overall seat air conditioning unit 320 can be formed below the console 400, but a part of the seat air conditioning unit 320 is formed below the console 400 and the remaining can be also formed below the seat 100. That is, a heat exchange space S12, an inlet 410 for guiding the air of the passenger compartment S1 to the heat exchange space S12, and a discharge flow path 420 for guiding the air of the heat exchange space S12 to the seat duct 310 can be formed inside the console 400; the first heat exchanger 342 can be formed in the heat exchange space S12; the first air blower 370 can be formed on any one of the heat exchange space, the inlet 410, and the discharge flow path 420; and the second heat exchanger 344, the second air blower 380, the compressor 341, and the expansion means 343 can be formed below the seat 100. In this case, as the first heat exchanger 342 and the first air blower 370 are not formed in the separation space S11, it is possible to prevent the first heat exchanger 342 and the first air blower 370 from being interfered with the seat 100 in advance, thus further enhancing the convenience of the mobility of the seat 100. Meanwhile, the discharge flow path 420 can be formed with a pipe having one end portion communicated with the heat exchange space S12 and having the other end portion communicated with the separation space S11 in order not to hinder the movement of the seat 100. Or, the discharge flow path 420 can be also formed with a flexible pipe having one end portion communicated with the heat exchange space S12, having the other end portion communicated with the seat duct inlet 312, and that at least part thereof can be deformed. In this case, the partition member 150 can be omitted.

INDUSTRIAL APPLICABILITY

The present disclosure can provide the air conditioning device for the vehicle seat, which can enhance the mobility of the seat.

In addition, the present disclosure can provide the air conditioning device for the vehicle seat, which can prevent the noise and vibration by the driving parts from being delivered to the passenger.

The invention claimed is:
1. An air conditioning device for a vehicle seat, comprising:
 a seat duct formed on a seat of a vehicle;
 an air conditioning unit formed on a lower frame on which the seat is mounted; and a separation space interposed between the seat and the lower frame, wherein it is formed so that the air is discharged from the air conditioning unit into the separation space, and the air of the separation space is supplied to the seat duct, wherein the air conditioning unit includes
- a vapor compression refrigeration cycle mechanism having first heat exchanger operated as any one of an evaporator and a condenser, a second heat exchanger operated as the other one of the evaporator and the condenser, a compressor, an expansion means, and a refrigerant flow path passing through the first heat exchanger, the second heat exchanger, the compressor, and the expansion means,
- a first air blower for flowing the air through the first heat exchanger; and
- a second air blower for flowing the air through the second heat exchanger, wherein the seat is movably formed, wherein the first heat exchanger is formed within a movement range of the seat, and wherein the first air blower is formed at the inlet side of the seat duct, wherein the seat is formed with a partition member enclosing the separation space and having an inlet for guiding the air of a passenger compartment to the separation space, and wherein the partition member has one end portion fixed to the seat, and has the other end portion formed with a curtain that is slidable with respect to the lower frame.

2. The air conditioning device for the vehicle seat of claim 1, wherein the first heat exchanger and the first air blower reformed to suction air from a passenger compartment of a vehicle to flow through the first heat exchanger, and then to supply it to the separation space, and wherein the second heat exchanger and the second air blower are formed to suction air from an outside of the vehicle to flow through the second heat exchanger, and then to discharge it into the outside of the vehicle.

3. The air conditioning device for the vehicle seat of claim 1, wherein by adjusting the refrigerant flow path, the vapor compression refrigerant cycle mechanism is formed so that the second heat exchanger is operated as a condenser when the first heat exchanger is operated as an evaporator, and the second heat exchanger is operated as an evaporator when the first heat exchanger is operated as a condenser.

4. The air conditioning device for the vehicle seat of claim 1, wherein the first heat exchanger, the first air blower, and an inlet of the seat duct are formed in the separation space between the seat and the lower frame.

5. The air conditioning device for the vehicle seat of claim 1, wherein a console provided on the side portion of the seat is formed with a heat exchange space in which the first heat exchanger is installed, an inlet for guiding the air of a passenger compartment to the heat exchange space, and a discharge flow path for guiding the air of the heat exchange space to the separation space, and wherein the first air blower is formed on any one of the heat exchange space, the inlet, and the discharge flow path.

6. The air conditioning device for the vehicle seat of claim 1, wherein the first heat exchanger and the first air blower are formed on an outside of the vehicle, and wherein the lower frame is formed with a flow path extended from a passenger compartment of the vehicle to the first heat exchanger and the first air blower sides and a flow path extended from the first heat exchanger and the first air blower sides to the separation space.

7. An air conditioning device for a vehicle seat, comprising:

a seat duct formed on a seat of a vehicle;

an air conditioning unit formed on a lower frame on which the seat is mounted; and a separation space interposed between the seat and the lower frame, wherein it is formed so that the air is discharged from the air conditioning unit into the separation space, and the air of the separation space is supplied to the seat duct, wherein the air conditioning unit includes
- a vapor compression refrigeration cycle mechanism having a first heat exchanger operated as any one of an evaporator and a condenser, a second heat exchanger operated as the other one of the evaporator and the condenser, a compressor, an expansion means, and a refrigerant flow path passing through the first heat exchanger, the second heat exchanger, the compressor, and the expansion means,
- a first air blower for flowing the air through the first heat exchanger; and
- a second air blower for flowing the air through the second heat exchanger, wherein the second heat exchanger, the second air blower, and the compressor are installed on an outside of the vehicle, wherein the lower frame comprises a recess part that is recessed from the outside of the vehicle toward a passenger compartment side of the vehicle, and wherein the second heat exchanger, the second air blower, and the compressor are received in the recess part.

8. The air conditioning device for the vehicle seat of claim 7, wherein the lower frame is formed with a cover for covering the recess part, and wherein the cover prevents the second heat exchanger, the second air blower, and the compressor from being collided with a road surface.

* * * * *